(12) United States Patent
Shishido

(10) Patent No.: US 6,181,063 B1
(45) Date of Patent: Jan. 30, 2001

(54) ELECTION DISCHARGE DEVICE AND ELECTION DISCHARGE METHOD

(75) Inventor: Fumio Shishido, Kawasaki (JP)

(73) Assignee: Shinichi Sugihara, Kanagawa (JP)

( * ) Notice: Under 35 U.S.C. 154(b), the term of this patent shall be extended for 0 days.

(21) Appl. No.: 09/308,930

(22) PCT Filed: Nov. 17, 1997

(86) PCT No.: PCT/JP97/04177

§ 371 Date: Jul. 27, 1999

§ 102(e) Date: Jul. 27, 1999

(87) PCT Pub. No.: WO98/24108

PCT Pub. Date: Jun. 4, 1998

(30) Foreign Application Priority Data

Nov. 28, 1996 (JP) .................................................. 8-317530

(51) Int. Cl.⁷ ................................ H01J 1/30; H01J 9/02
(52) U.S. Cl. .......................... 313/509; 313/506; 313/633; 313/355; 313/311
(58) Field of Search ..................................... 313/498, 506, 313/509, 631, 633, 231.41, 311, 355

(56) References Cited

U.S. PATENT DOCUMENTS 5,272,414 * 12/1993 Iwanaga ........................... 313/355 X
6,025,677 * 2/2000 Mos, III et al. .................. 313/498 X

FOREIGN PATENT DOCUMENTS 44-10407 B1    5/1969  (JP) .
4-312738       11/1992 (JP) .
6-177020        6/1994 (JP) .

OTHER PUBLICATIONS

Kitai et al., SID International Symposium Digest of Technical Papers, US, Playa Del Rey, SID, vol. 22, pp. 440–443, XP000503070.

* cited by examiner

Primary Examiner—Ashok Patel
(74) Attorney, Agent, or Firm—Burns, Doane, Swecker & Mathis, LLP

(57) ABSTRACT

An electron discharge device characterized in having a conductive layer on one surface of a dielectric substrate, a dielectric layer and a conductive layer, in this order, on the other surface of the substrate, wherein the dielectric layer has a thickness equal to or less than 5 nm and a permittivity lower than that of the dielectric substrate. A method for discharging electrons from a surface of a conductive layer (2) by applying voltage between conductive layers (1) and (2) of a device having the conductive layer (1) on one surface of a dielectric substrate, a dielectric layer and the conductive layer (2), in this order, on the other surface of the substrate, wherein the dielectric layer has a thickness equal to or less than 5 nm and a permittivity lower than that of the dielectric substrate, such that a conductive layer (1) serves as a cathode and that the conductive layer (2) serves as an anode. According to the present invention, a novel structured electron discharge device for discharging electrons in utilizing the tunnel effect but hardly suffering from insulation breakdowns otherwise caused by the bias voltage and a method for discharging electrons using this device are provided.

13 Claims, 1 Drawing Sheet

ELECTION DISCHARGE DEVICE AND ELECTION DISCHARGE METHOD

TECHNICAL FIELD

This invention relates to an electron discharge device and a discharge method. The electron discharge device and the discharge method of the invention are useful for physical or chemical processings or the like which requires a large amount of electrons.

TECHNICAL BACKGROUND

Various types of electron discharge electrodes and devices (hereinafter, referred to as "electron discharge device") have been known and used in the art of discharge and light-emitting. There are two types in such an electron discharge electrode: a thermal electron source, and a cooled cathode electron source. As such a cooled cathode electron source, a field emission type (FE type) electron discharge device, a metal/insulator/metal type (MIM type) electron discharge device, and surface transmission type electron discharge device have been known.

With respect to an MIM type electron discharge device, Mead indicated that a device such as Al—$Al_2O_3$—Al, Ta—$Ta_2O_5$—Au, and so on operated as a vacuum emitter. The MIM type electron discharge device discharges electrons when tunnel electrons pass through an insulation film (I) such as $Al_2O_3$. This device, however, cannot enjoy discharging stably with high efficiency, and may suffer from insulation breakdowns due to a highly biased electric field for discharging electrons, thereby raising a problem in stability of the device itself, so that such a device is still not be used practically.

It is an object of the invention to provide a novel structured electron discharge device for discharging electrons in utilizing the tunnel effect but hardly suffering from insulation breakdowns otherwise caused by the bias voltage and a method for discharging electrons using this device.

SUMMARY OF THE INVENTION

This invention relates to an electron discharge device characterized in having a conductive layer on one surface of a dielectric substrate, a dielectric layer and a conductive layer, in this order, on the other surface of the substrate, wherein the dielectric layer has a thickness equal to or less than 5 nm and a permittivity lower than that of the dielectric substrate.

In this electron discharge device, the dielectric layer can have a uniform or not uniform thickness.

In the electron discharge device, the dielectric substrate can have a permittivity, e.g., five times or more of that of the dielectric layer.

This invention also relates to a method for discharging electrons from a surface of a conductive layer (2) by applying voltage between conductive layers (1) and (2) of a device having the conductive layer (1) on one surface of a dielectric substrate, a dielectric layer and the conductive layer (2), in this order, on the other surface of the substrate, wherein the dielectric layer has a thickness equal to or less than 5 nm and a permittivity lower than that of the dielectric substrate, such that the conductive layer (1) serves as a cathode and that the conductive layer (2) serves as an anode.

EMBODIMENTS FOR USING THE INVENTION

Electron Discharge Device

Figure 1:
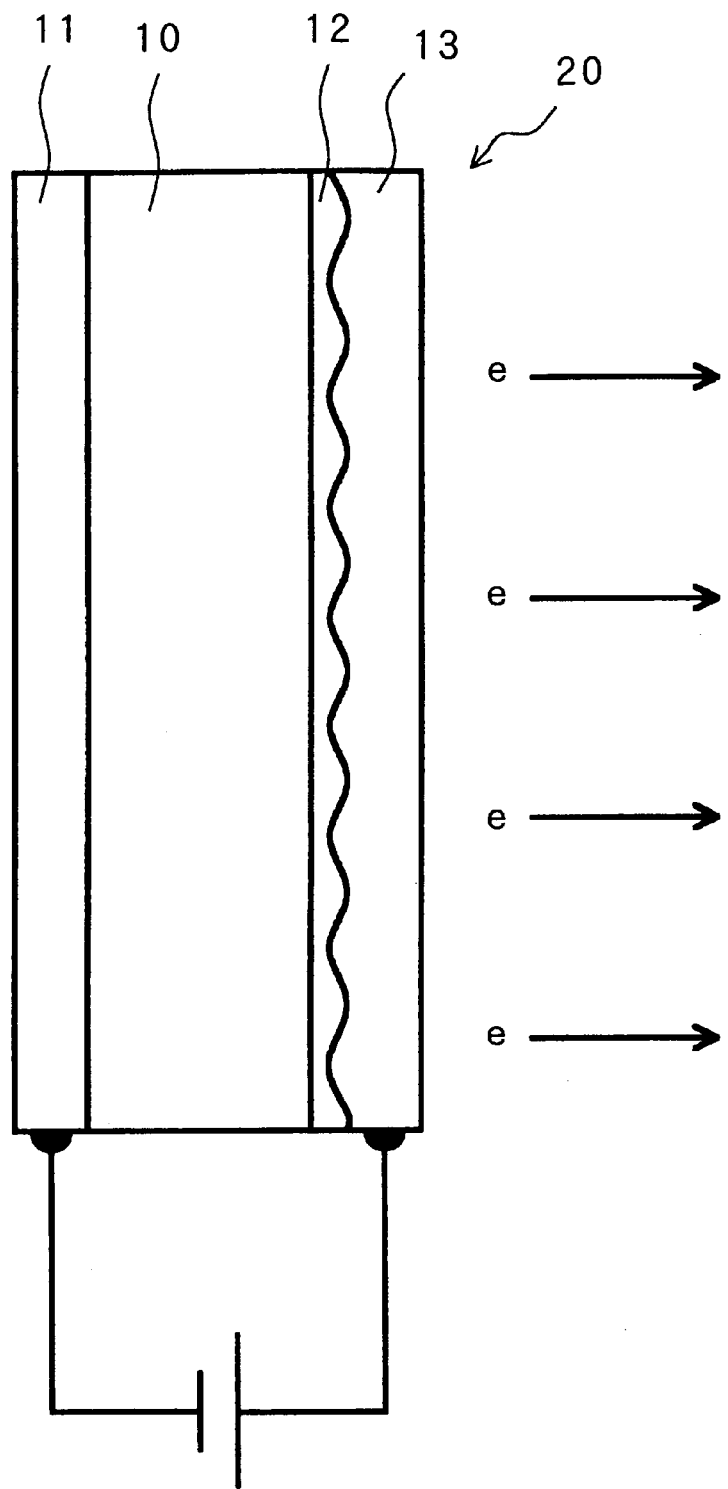
FIG. 1 is an illustration showing an electron discharge device and a discharging method according to the invention.

The electron discharge device according to the invention has a conductive layer on one surface of a dielectric substrate, a dielectric layer and a conductive layer, in this order, on the other surface of the substrate. The dielectric substrate is made of a material showing dielectric property and can be made of, e.g., a material having a permittivity $\epsilon$ in a range of about 80 to $10^5$. As a material for the dielectric substrate, exemplified are, e.g., titanium oxide as a paraelectrics, lead zirconate, sodium niobate as an antiferroelectrics, and barium titanate as a ferroelectrics, and so on. The thickness of the dielectric substrate can be determined properly in consideration of, e.g., discharge property, and strength, and can be in a range of 0.1 to 10 microns, preferably, in a range of 0.2 to 2 microns.

The suitable two conductive layers are materials which are hard to be chemically modified such as oxidation or the like at boundaries between the dielectric layer and the dielectric substrate and between the dielectric layer and the open air. Particularly, the conductive layer formed on the dielectric layer likely sustains chemical modifications, and therefore, a suitable material should be chemically stable. As a material for the conductive layer formed on the dielectric layer, for example, noble metals such as gold, platinum, and the like, which are well conductive and chemically stable, can be used. The conductive layer formed on the dielectric layer can be a material having a relatively low chemical stability such as aluminum or the like, in addition to the above metals, because the layer hardly sustains chemical modifications. The conductive layer formed on the dielectric substrate may have a multilayer structure in which a layer made of a chemically stable noble metal such as gold, platinum, or the like, is formed on the dielectric substrate and in which another layer made of a metal having a relatively low chemical stability such as aluminum is formed on the layer.

There is no special limitation on the thickness of the conductive layer on the dielectric substrate. To the contrary, the conductive layer formed on the dielectric layer is suitably in a range of 20 nm±10 nm from a viewpoint to discharging electrons easily.

The dielectric layer is suitably made of a material having a relatively low permittivity and properly has a permittivity one fifth of that of the dielectric substrate, preferably, one twentieth of that. As an example of such a material, an LB film, a silicon oxide such as quartz, a potassium chloride, and the like can be exemplified. In addition to the above materials, materials substantially the same as what are proposed as MIM type electron discharge devices can be used. The dielectric layer is a layer having a thickness of 5 nm or less, and the thickness of the layer can be either uniform or not uniform. It is to be noted that easiness of occurrence of electron discharges likely depends on the thickness of the dielectric layer where the material and thickness of the dielectric substrate and the material of the dielectric layer are determined, and therefore, where a uniform layer is formed, it is desirable to determine the thickness of the dielectric layer in consideration of the easiness of occurrence of electron discharges. In the case of a not uniform layer, an electron discharge device can be advantageously obtained without accurately controlling the thickness of the layer, because the electrons themselves are discharging in selecting locations at which discharges can be done easily. Where a not uniform layer is made with a thickness in the above range, electrons can be easily injected with high productivity into the conductive layer in contact with the not uniform layer. The dielectric layer is a not uniform layer having a thickness of preferably 4 nm or less.

As an example of the invented device, for example, first, a dielectric substrate: titanium oxide, a dielectric layer: quartz, second, a dielectric substrate: barium titanate, dielectric layer: lead strontianite can be exemplified. However, the device is not limited to those.

The device according to the invention can be manufactured in use of a thin film manufacturing technology such as a physical or chemical gas phase growth method, a vacuum deposition method, an MBE method, a CVD method, and so on, which are used in semiconductor manufacturing fields.

Electron Discharge Method

A method for discharging electrons in use of the invented device and its mechanism are described based on FIG. 1.

The device according to the invention has a conductive layer (1) 11 on one surface of a dielectric substrate 10 and has a dielectric layer 12 and a conductive layer (2) 13, in this order, on the other surface. The dielectric layer 12 has a thickness of 5 nm or less, and the thickness can be uniform or not uniform in the above range. A voltage applies between the conductive layer (1) 11 and the conductive layer (2) 13 of the device so that the conductive layer (1) forms a cathode and the conductive layer (2) forms a anode. Positive holes and electrons are generated at a boundary between the dielectric substrate 10 and the dielectric layer 12, and the electrons reach the conductive layer (2) 13 in transmitting through the dielectric layer 12 by the tunnel effect and are discharged outside from the surface of the conductive layer (2) 13. On the other hand, the positive holes are recombined with electrons upon reaching the conductive layer (1) 11 after transmitting through the dielectric substrate 10.

The discharge amount of the electrons discharged from the surface of the conductive layer (2) can be changed by the device structure (particularly, thickness and material property (permittivity) of the dielectric substrate 10, and thickness and material property (permittivity) of the dielectric layer 12) and the bias voltage.

The device and the electron discharge method according to the invention can be used, as they are, not only for application done with conventional electron discharge devices such as discharging lamps, discharging tubes, monitor displays, but also for widening applications in a chemical field such as environmental devices because of a large electron discharging amount. For example, the device can supply a large amount of electrons, so that the device is applicable to collection of dusts and recycling processings for chemical products.

Embodiments

This invention will be further described below in detail by embodiments.

First Embodiment

A titanium oxide film was formed on a gold thin film (film thickness 1 micron) by a CVD method with a thickness of 1 micron. A quartz film, not uniform film, was formed with a thickness profile in a range of the thickness of 5 microns by an MBE method. Another gold thin film (thickness 20 nm) was formed on the titanium oxide film to obtain the device of the invention.

Where voltage of 50 Volts was applied to both of the gold thin films of this device, discharges of electrons from the surface of the gold thin film in contact with the quartz film were confirmed.

Second Embodiment

A titanium oxide film was formed on a gold thin film (film thickness 1 micron) by a CVD method with a thickness of 1.5 microns. A quartz film, not uniform film, was formed with a thickness profile in a range of the thickness of 4 microns by a CVD method. Another gold thin film (thickness 20 nm) was formed on the titanium oxide film to obtain the device of the invention.

Where voltage of 55 Volts was applied to both of the gold thin films of this device, discharges of electrons from the surface of the gold thin film in contact with the quartz film were confirmed.

According to the invention, there can provide an electron discharge device having a novel structure in which discharges of electrons are made in utilizing the tunnel effect in hardly sustaining breakdowns due to the based voltage and a method for discharging electrons using this device.

What is claimed is:

1. An electron discharge device comprising a conductive layer on one surface of a dielectric substrate, a dielectric layer and a conductive layer, in this order, on the other surface of the substrate, wherein the dielectric layer has a thickness equal to or less than 5 nm and a permittivity lower than that of the dielectric substrate.

2. The electron discharge device according to claim 2, wherein the dielectric layer has a uniform or not uniform thickness.

3. The electron discharge device according to claim 1, wherein the dielectric substrate has a permittivity five times or more of the permittivity of the dielectric layer.

4. The electron discharge device according to claim 1, wherein the dielectric substrate is made of a material having dielectric property.

5. The electron discharge device according to claim 1, wherein the dielectric substrate is made of a material having a permittivity in a range of about 80 to $10^5$.

6. The electron discharge device according to claim 1, wherein the dielectric substrate is made of at least one type material selected from the group of paraelectrics, antiferroelectrics, and ferroelectrics.

7. The electron discharge device according to claim 1, wherein the dielectric substrate comprises at least one type of material selected from the group of titanium oxide, lead ziconate, sodium niobate, and barium titanate.

8. The electron discharge device according to claim 1, wherein the thickness of the dielectric substrate is in a range of 0.1 to 10 microns.

9. The electron discharge device according to claim 1, wherein the conductive layer formed on the dielectric layer is selected from noble metals.

10. The electron discharge device according to claim 1, wherein the conductive layer formed on the dielectric layer is made of a metal selected from a group of noble metals and aluminum.

11. The electron discharge device according to claim 1, wherein the thickness of the conductive layer formed on the dielectric layer is in a range of 20 nm±10 nm.

12. The electron discharge device according to claim 1, wherein the dielectric layer is selected from a group of an LB film, silicon oxide, and potassium chloride.

13. A method for discharging electrons from a surface of a conductive layer (2) by applying voltage between conductive layers (1) and (2) of a device having the conductive layer (1) on one surface of a dielectric substrate, a dielectric layer and the conductive layer (2), in this order, on the other surface of the substrate, wherein the dielectric layer has a thickness equal to or less than 5 nm and a permittivity lower than that of the dielectric substrate, such that a conductive layer towards the one surface serves as a cathode and that the conductive layer towards the other surface serves as an anode.

\* \* \* \* \*